US012640503B2

(12) United States Patent
Beene

(10) Patent No.: US 12,640,503 B2
(45) Date of Patent: May 26, 2026

(54) ELECTRICAL GROUNDING CLAMP AND METHODS OF USE

(71) Applicant: Jill Beene, Merced, CA (US)

(72) Inventor: Jill Beene, Merced, CA (US)

( * ) Notice: Subject to any disclaimer, the term of this patent is extended or adjusted under 35 U.S.C. 154(b) by 386 days.

(21) Appl. No.: 18/385,770

(22) Filed: Oct. 31, 2023

(65) Prior Publication Data

US 2025/0141127 A1 May 1, 2025

(51) Int. Cl.
*H01R 4/50* (2006.01)

(52) U.S. Cl.
CPC .................................. *H01R 4/5091* (2013.01)

(58) Field of Classification Search
CPC .................................................... H01R 4/5091
USPC ......................................................... 439/807
See application file for complete search history.

(56) References Cited

U.S. PATENT DOCUMENTS

| | | | |
|---|---|---|---|
| 2,420,895 A | 5/1947 | Merriman | |
| 2,679,032 A | 5/1954 | Thomas, Jr. et al. | |
| 3,363,219 A | 1/1968 | Hubbard et al. | |
| 3,363,310 A | 1/1968 | Stinson, Jr. | |
| 3,594,706 A | 7/1971 | Sotolongo | |
| 3,830,427 A | 8/1974 | Polidori | |
| 4,780,096 A | 10/1988 | Franks, Jr. | |
| 5,240,423 A | 8/1993 | Morrison | |
| 7,160,142 B2 | 1/2007 | Hughes et al. | |
| 8,864,504 B1 | 10/2014 | Gretz | |
| 10,095,001 B2 | 10/2018 | Sakmar | |
| 10,164,356 B2 * | 12/2018 | Diop | H01R 4/42 |
| 11,404,802 B2 | 8/2022 | O'Connell et al. | |
| 2009/0258548 A1 | 10/2009 | Kossak et al. | |
| 2010/0144173 A1 | 6/2010 | Wason | |
| 2016/0344112 A1 | 11/2016 | Dinh et al. | |
| 2019/0148847 A1 | 5/2019 | Martin et al. | |

FOREIGN PATENT DOCUMENTS

| | | | | |
|---|---|---|---|---|
| EP | 3462545 B1 | | 7/2022 | |
| EP | 4167384 A1 | * | 4/2023 | H01R 13/6215 |
| WO | 2010043801 A1 | | 4/2010 | |
| WO | 2021/183065 A1 | | 9/2021 | |

OTHER PUBLICATIONS

Hubbell Power Systems, Inc., Chancer Grounding Equipment Catalog 3000, Aug. 20, 2020, (32 pages).
International Search Report and Written Opinion from co-pending application PCT/US2024/052153, Forms PCT/ISA/220, PCT/ISA/210, PCT/ISA/237 (Feb. 4, 2025).

* cited by examiner

*Primary Examiner* — Tulsidas C Patel
*Assistant Examiner* — Jeffrey Mountain
(74) *Attorney, Agent, or Firm* — Sierra IP Law, PC; Mark D. Miller

(57) ABSTRACT

Grounding clamps described herein provide a direct connection to ground between a power transmission or power distribution line and a nearby grounded L-shaped beam. The complementary L-shaped interfacing surfaces of the clamps described herein permit an operator to ground the clamps to an L-beam with a uniform distribution to the exterior and interior surfaces of the L-beam. The grounding clamps provide a secure and rigid bite into the interior and exterior surfaces of the L-beam, thereby preventing slip or dislodgement of the device when appropriately affixed thereby reducing the risk of electric shock.

20 Claims, 11 Drawing Sheets

319

ELECTRICAL GROUNDING CLAMP AND METHODS OF USE

FIELD OF THE INVENTION

The present invention relates generally to the installation and repair of above surface electrical distribution cables or lines and lineman protective equipment. More particularly, the present invention provides an adjustable no slip grounding clamp that is operable to secure to an L-beam structural member of high-voltage transmission structures.

BACKGROUND OF THE INVENTION

Grounding clamps are used to protect linemen from electrocution, while various grounding clamps exist and are devices used to create a secure electrical connection between a conductive object and the ground. It ensures that any stray electrical current is safely directed into the earth, reducing the risk of electric shock or other electrical hazards. In electrical systems, grounding is essential for safety and proper functionality. A grounding clamp typically consists of a metal clamp that can be affixed to a grounding wire and the object that needs to be grounded. The clamp ensures a robust and low-resistance connection to the ground, allowing current to flow easily into the earth if a fault occurs. Grounding clamps affixed to flat surfaces are generally safe. However, grounding clamps affixed to L-beams (angle beams) present unique issues and shortfalls that present grounding clamps fail to address. L-beams are commonly used in many power transmission towers including without limitation 110 kV power transmission towers, and can vary widely based on the specific design requirements, load conditions, engineering standards, and design and engineering requirements of the tower. Factors such as the tower's height, the number of circuits it carries, the wind and ice loading for the location, and the applicable design standards will all influence the size of the L-beams selected. However, a general range might include plates of equal angles, where both legs are the same width, and may have leg size ranging from 50×50 mm to 200×200 mm, with thicknesses varying from 5 mm to 20 mm. Some L-beams may have unequal angles, and the legs may have different widths, and may have sizes ranging from 75×50 mm to 200×150 mm, with thicknesses again varying from 5 mm to 20 mm.

The National Electrical Safety Code (NESC) has provisions and sets the ground rules for practical safeguarding of persons during the installation, operation, or maintenance of electric supply and communication lines related to grounding for utility workers, local municipal electrical rules, and the National Electrical Code (NEC) has grounding requirements which are detailed in Article 250, which covers general grounding and bonding requirements. Utility companies may have standards, and the Occupational Safety and Health Administration (OSHA) has regulations covering electrical workers' safety. Nevertheless, such codes and regulations fail to cure the shortcomings that L-shaped beams present for grounding clamps due to the L-beam's geometry. Clamps used with L-beams may not have uniform contact with the beam, leading to increased resistance in the grounding path, which can reduce the effectiveness of the grounding system. Material compatibility and accessibility of the L-shaped beam may lead to difficulties when correctly positioning and securing existing grounding clamps. Proper positioning is a time-consuming process for linemen and may lead to potential errors in the ground setup. Even if properly positioned, existing ground clamps used with L-shaped beams can be easily dislodged, leading to exposure to the electricity in the line.

Since the purpose of a grounding clamp is to protect electrical linemen from electrical shocks, especially when working with high voltage/amperage applications, deficiencies and problems associated with conventional grounding devices, particularly with regard to attachment or dislodgement problems encountered with these devices, can result in dangerous conditions for line workers. Embodiments of the present invention provide solutions to these deficiencies, many examples of which are described in detail herein.

SUMMARY OF THE INVENTION

The present invention provides grounding clamps that are operable to electrically connect a ground cable to an L-shaped structural member of a high voltage transmission tower, and methods of using such clamps. Embodiments of the present invention are designed for engagement with a structural member of a transmission tower known as an L-beam, which is a structural element having a cross-sectional shape resembling the letter "L." An L-beam consists of two generally perpendicular legs or flanges that intersect at an angle of approximately 90 degrees defining an interior surface and an exterior surface. The interior surface of an L-beam refers to the concave side where the two legs intersect and is the side that forms the interior angle of 90 degrees between the legs. The vertex or fillet at the intersection of the legs, is also part of the interior surface. The exterior surface of an L-beam is the convex side opposite to the interior surface, which comprises the outer faces of the two perpendicular legs.

In various embodiments, the grounding clamps of the present invention include a main body having a cross-sectional shape that is complementary to the cross-sectional shape of the L-beam, including an interior surface (concave side) and an exterior surface (convex side). The main body of each embodiment of the present invention includes a ground cable receiver that is operable to couple the main body to one end of a grounding cable, with the other end of the cable being coupled to a wire or other structure to be grounded. In operation, electrical power to a wire to be repaired is disconnected. A grounding clamp of the present invention is then securely physically engaged with an L-beam of a nearby electrical support structure (e.g., a leg of a tower); one end of a grounding cable is attached to a receiver on the grounding clamp, and the other end of the cable is attached to the de-energized wire to be repaired. This provides a grounding path for electricity to follow in the unlikely event that the wire becomes re-energized for any reason. The grounding clamps of the present invention are designed for secure attachment so that they may not be inadvertently kicked or pulled away from the L-beam while engaged. The ground clamps of the present invention may therefore be operable to prevent electric shock to a lineman in the event that the de-energized wire somehow becomes electrically charged.

Embodiments of the present invention may include ground clamps having a main body and a wedge member. The wedge member may have two perpendicular planar faces positioned at 90 degrees from each other, and an advancement mechanism that is operable to adjust the position of the wedge member against an L-beam. In these embodiments, the main body is operable to secure around the exterior surface of the L-beam and the wedge member is positioned on the interior of the L-beam. The advancement mechanism is operable to insert the wedge member into the vertex of the L-beam, thereby compressing the L-beam between the interior surface of the main body and the planar faces of the wedge member. The advancement mechanism may have a proximal end securing a handle, a distal end that is rotatably coupled to the wedge member, and threading between the distal end and proximal end.

In some embodiments, the main body may include a rigid right-angle member having a peripheral alignment structure along each lateral side of the member; the alignment structures may be positioned along the sides of each leg along the side opposite from the intersection of each plate. In such embodiments, the grounding clamp may include a separate alignment plate having alignment structures that protrude longitudinally along the lateral sides of the alignment plate, the alignment structures may be complementary to the peripheral alignment structure of the right angle member. The alignment plate may further include a centrally located aperture with internal threading that is operable to receive threading of the advancement mechanism. The aperture may have a center axis that is positioned inline with the center of rigid right-angle member intersection when assembled.

In some embodiments, the wedge member may include a base surface with a centrally positioned aperture that is operable to receive the distal end of the advancement mechanism. In such embodiments, the distal end of the advancement mechanism may include a channel and the wedge may include a pinhole that is perpendicular to the center axis of the aperture. The advancement mechanism may be secured to the wedge using a shaft, fastener, pin, cotter pin, or the like inserted into the pinhole and channel.

In some embodiments, the main body may have an extending member projecting perpendicularly from a top peripheral edge of a vertical plate, the extending member including a threaded opening. The extending member may position a center axis of the threaded opening in line with the center of the vertex edge, such that the advancement mechanism is operable to linearly translate the wedge member from a clamped and unclamped position. In such embodiments, the wedge member may be coupled to the advancement mechanism using a U-joint to allow for the swiveling of the wedge and no interference.

In some embodiments, the grounding clamp may have an interior body and an exterior body that is operable to clamp around the L-beam. In such embodiments, both the exterior body and interior body have a horizontal plate and a vertical plate. The two bodies are coupled together using a hinge connecting the vertical plate of the interior body to the vertical plate of the exterior body. The interior body may have a slot on the peripheral edge of the horizontal plate that is operable to receive an exterior body fastener. The exterior body fastener may be rotatably coupled to the horizontal plate and may swivel into a slot and be fixed in place with a bolt or nut. The exterior body may secure a ground cable receiver for coupling a ground cable. In such embodiments, the L-beam is sandwiched between the exterior surface of the interior body and the interior surface of the exterior body.

In some embodiments, the interior surface of the main body and the planar faces of the wedge member may be smooth, or it may have a grip-enhancing structure, for example, and without limitation, an indented pattern, a crosshatch pattern, serrated edges, ridges and grooves, a knurled surface, or the like. In such embodiments, the grip-enhancing structures provide a clutch on the L-beam to prevent slippage of the grounding clamp.

In one aspect of the invention, a grounding clamp for use with an L-shaped beam may be provided that comprises a rigid metallic base member with a first plate and a second plate wherein an edge of the first plate is attached to an edge of the second plate at a right angle defining an interior surface and an exterior surface, in which a first angled flange is provided at an opposite edge of the first plate and a second angled flange is provided at an opposite edge of the second plate; and a rigid metallic alignment member having a threaded aperture therein, a third angled flange at one edge of the alignment member, and a fourth angled flange at an opposite edge of the alignment member, wherein the first and third flanges are complementary to and capable of interlocking with each other, and the second and fourth flanges are complementary to and capable of interlocking with each other, for coupling the base member and the alignment member around the L-shaped beam; and a threaded shaft for engagement with the threaded aperture, the shaft having a handle at a proximal end thereof; and a wedge member having a triangular cross section rotatably coupled to a distal end of the shaft.

In different aspects of the grounding clamp above, rotation of the shaft moves said wedge member toward the interior surface of the base member. In other aspects, the triangular wedge member includes first and second surfaces having interior edges attached to each other at a right angle, and a third surface attached between opposite edges of the first and second surfaces, wherein the third surface has a recess therein for engagement with a distal end of the shaft, and an exterior of the first and second surfaces is complementary to the interior surface of the base member. In other aspects, a receiver is attached to the exterior surface of the base that is operable to receive a grounding cable. In other aspects, a grip-enhancing structure is provided on either the interior surface of the base member, the outer surface of said wedge member, or both. In other aspects, the grip-enhancing structure is selected from the group of a rough surface, an indented pattern, a crosshatch pattern, serrated edges, ridges and grooves, a knurled surface, and combinations thereof. In other aspects, a channel is provide near a distal end of the shaft, a pinhole is provided in the wedge member, and pin is provided to engage with the channel through the pinhole. In other aspects, the rigid base member has a generally L-shaped cross-section that is complementary to the geometry of the L-angle beam.

In another aspect of the invention, a grounding clamp for use with an L-shaped beam is provided comprising a rigid metallic base member comprising a first plate and a second plate wherein an edge of the first plate is attached to an edge of the second plate at a right angle defining an interior base surface and an exterior base surface, the base member further comprising a support member attached at an opposite edge of one of the first plate and the second plate, the support member having a threaded opening therein; and a threaded shaft is provided for engagement with the threaded opening, the shaft having a handle at a proximal end thereof; and a wedge member comprising a first wedge plate and a second wedge plate is provided wherein an edge of the first wedge plate is attached to an edge of the second wedge plate at a right angle defining an interior wedge surface and an exterior wedge surface, wherein the exterior wedge surface is complementary to the interior base surface; and a receptacle is pivotally attached to the interior wedge surface for receiving a distal end of the shaft.

In different aspects of the grounding clamp above, the receptacle comprises a U-joint having an opening therein for receiving the distal end of the shaft. In other aspects, a pair of flanges having openings therein are provided on the interior wedge surface, and the U-joint is pivotally attached to the wedge surface using an alignment pin extending through the flange openings and a through hole in the U-joint. In other aspects, rotation of the shaft moves the wedge member toward the interior surface of the base member. In other aspects, a channel is provided near a distal end of the shaft, a fastening hole in provided in the receptacle, and post is provided that is operable to engage with the channel through fastening hole. In other aspects, a grip-enhancing structure is provided on either the interior surface of the base member, the exterior surface of the wedge member, or both. In other aspects, the grip-enhancing structure is selected from the group of a rough surface, an indented pattern, a crosshatch pattern, serrated edges, ridges and grooves, a knurled surface, and combinations thereof. In other aspects, a receiver is attached to the exterior surface of the base that is operable to receive a grounding cable.

In another aspect of the invention, a grounding clamp for use with an L-shaped beam is provided having a rigid metallic base member comprising a first plate and a second plate wherein an edge of the first plate is attached to an edge of the second plate at a right angle defining an interior base surface and an exterior base surface, the base member further comprising a hinge located at an opposite edge of the first base plate; and a wedge member is provided comprising a first wedge plate and a second wedge plate wherein an edge of the first wedge plate is attached to an edge of the second wedge plate at a right angle defining an interior wedge surface and an exterior wedge surface, wherein an opposite edge of the first wedge plate is movably engaged with the hinge; and a clamp is provided at an opposite edge of the second base plate for engagement with an opposite edge of the second wedge plate.

In different aspects of the grounding clamp above, a receiver may be attached to the exterior surface of the base that is operable to receive a grounding cable.

In another aspect of the invention, a method for electrically grounding an L-shaped beam is provided comprising the steps of: positioning a first rigid metallic L-shaped member having an interior surface and exterior surface against an outer surface of said L-shaped beam; positioning a second rigid metallic member having an L-shaped exterior surface against an interior surface of said L-shaped beam; securely clamping said first and second rigid metallic members together around said L-shaped beam; and connecting an electrical cable to a cable receiver on said exterior surface of said first rigid member. In different aspects, a support member having a threaded opening therein is provided adjacent to the second rigid metallic member, and a threaded shaft is provided for insertion into the opening, and the method comprises the additional step of rotating the shaft to tighten the second rigid metallic member against the L-shaped beam.

It is also an aspect of the present invention to provide a grounding clamp for L-angle beams, the device may include, a rigid right-angle member having a horizontal plate and a vertical plate, each having an interior surface, an exterior surface, and a peripheral alignment structure along each lateral side of the member; an alignment plate having a centrally located aperture with internal threading and an alignment structure protruding longitudinally along the lateral sides of the alignment plate; an advancement mechanism aligned with the alignment plate aperture; and a wedge member rotatably coupled to the advancement mechanism, the wedge member may include, a base surface having an aperture and a pinhole perpendicular to a neutral axis of the aperture; and bifurcated planar faces extending from the base surface, wherein the faces have a geometry complementary to the right-angle member exterior surface. The alignment structures of the alignment plate and the rigid right-angle member may interlock, thereby positioning the interior surface of the rigid right-angle member against an outer surface of an L-angle beam, and wherein the advancement mechanism is rotatably engaged, thereby translating the wedge member into the L-beam and bringing the bifurcated planar faces into contact with an interior surface of the L-beam, thereby compressing the L-beam. The ground clamp may include a ground cable receiver that is operable to secure a ground cable and the receiver may be positioned on the exterior surface of the rigid right-angle member. The ground clamp may include a grip-enhancing structure applied to the interior surface of the rigid right angle member and the bifurcated planar faces of the wedge member. The advancement mechanism may have a distal end including a channel and a proximal end having a handle with threading therebetween. The threading may engage with the internal aperture threading to translate the wedge into a clamping position. A pin may be provided, which may be operable to engage with the wedge member pinhole and the channel, and the pin may secure the advancement mechanism to the wedge member rotatably. The alignment plate aperture may position a neutral axis of the advancement mechanism in a plane symmetrically positioned between the horizontal and vertical plates of the rigid right-angle member. The handle may be an eye hook, a T-handle, or a hand-turning structure. The rigid right angle member may have a generally L-shaped cross-section that is complementary to the geometry of an L-angle beam. The grip-enhancing structures may be an indented pattern, a crosshatch pattern, serrated edges, ridges and grooves, or a knurled surface.

It is another aspect of the present invention to provide a grounding clamp for L-angle beams, the clamp including, a main body including a rigid right-angle member having a horizontal plate and a vertical plate, each plate having an interior and exterior surface, and having a shared vertex edge, and an extending member projecting perpendicularly from a top peripheral edge of the vertical plate, the extending member configured to secure a conduit having threading, wherein a central axis of the conduit is in plane with the vertex edge of the right angle member; a wedge member having an exterior surface and an interior surface having a pair of flanges, each having a through hole, the flanges may be operable to align a U-joint that is rotatably coupled to the wedge using a shaft; and an advancement mechanism including a handle secured to a proximal end of a threaded shaft and a channel at a distal end, the threaded shaft being insertable into an aperture of the U-joint, and the channel being alignable with a U-joint fastening hole that is positioned orthogonal to a central axis of the aperture and linearly secured with a post inserted into the U-joint fastening hole and shaft channel. The threaded shaft of the advancement mechanism may engage with threading in the conduit to advance the wedge member to a compressing position. The interior surface of the rigid right angle member and the exterior surface of the wedge member may have a grip-enhancing structure that is operable to prevent slip from the wedge member and the rigid right angle member when in the compressing position. The clamp may include a ground cable receiver that may be operable to temporarily secure a ground cable, the receiver positioned on an exterior surface of the rigid right-angle member. The advancement mechanism handle may be operable to be turned by hand and may have a T-handle, a knob handle, a lever handle, a ring handle, a bar handle, or a wing nut geometry. The advancement mechanism handle may be engaged to linearly translate the wedge member to a compressing position, thereby coupling the ground cable to the L-beam.

It is another aspect of the present invention to provide, a method for electrically grounding an L-angle beam, the method may include the steps of, positioning an L-shaped rigid member having an interior surface and exterior surface to an outer surface of an L-angle beam; translating a second member, having an interior surface and exterior surface, to a clamped position, where the second member is translated to an interior corner of the L-angle beam and compressing the L-L-angle beam against the interior surface of the L-shaped rigid member; and connecting an electrical cable to a cable receiver positioned on the exterior surface of the rigid member. The L-angle beam may be a structural member of a high-voltage structure having a plurality of overhead transmission lines, and the electrical cable may be a de-energized electrical cable that is part of an electrical system being serviced. A plurality of grip-enhancing structures may be applied to the interior surface of the rigid member and to the exterior surface of the second member. The translating of the second member may include an advancement mechanism that is rotatably coupled to a receiver positioned on the interior surface of the second member. The translating of the second member may include a hinge connection between an edge of the first member and an edge of the second member, the hinge providing a linkage for rotating a second member around the L-angle beam. The method may further include turning a fastening mechanism positioned on an edge opposite to the hinge connection of the first and second member and compressing the L-angle beam on the interior and exterior surfaces.

Further aspects and embodiments will be apparent to those having skill in the art from the description and disclosure provided herein.

It is an object of the present invention to provide electrical grounding clamps that are operable for secure attachment to L-shaped beams in order to minimize the chance for inadvertent disengagement during use.

It is an object of the present invention to provide grounding clamps for engagement with L-shaped beams that may be easily attached and removed, but which provides secure attachment when engaged.

It is an object of the present invention to provide grounding clamps for engagement with L-beams of different sizes.

The above-described objects, advantages, and features of the invention, together with the organization and manner of operation thereof, will become apparent from the following detailed description when taken in conjunction with the accompanying drawings, wherein like elements have like numerals throughout the several drawings described herein. Further benefits and other advantages of the present invention will become readily apparent from the detailed description of the preferred embodiments.

DETAILED DESCRIPTION

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention. In the following disclosure, specific details are given to provide a thorough understanding of the invention. However, it will be apparent to one skilled in the art that the present invention may be practiced without all of the specific details provided.

Figure 1:
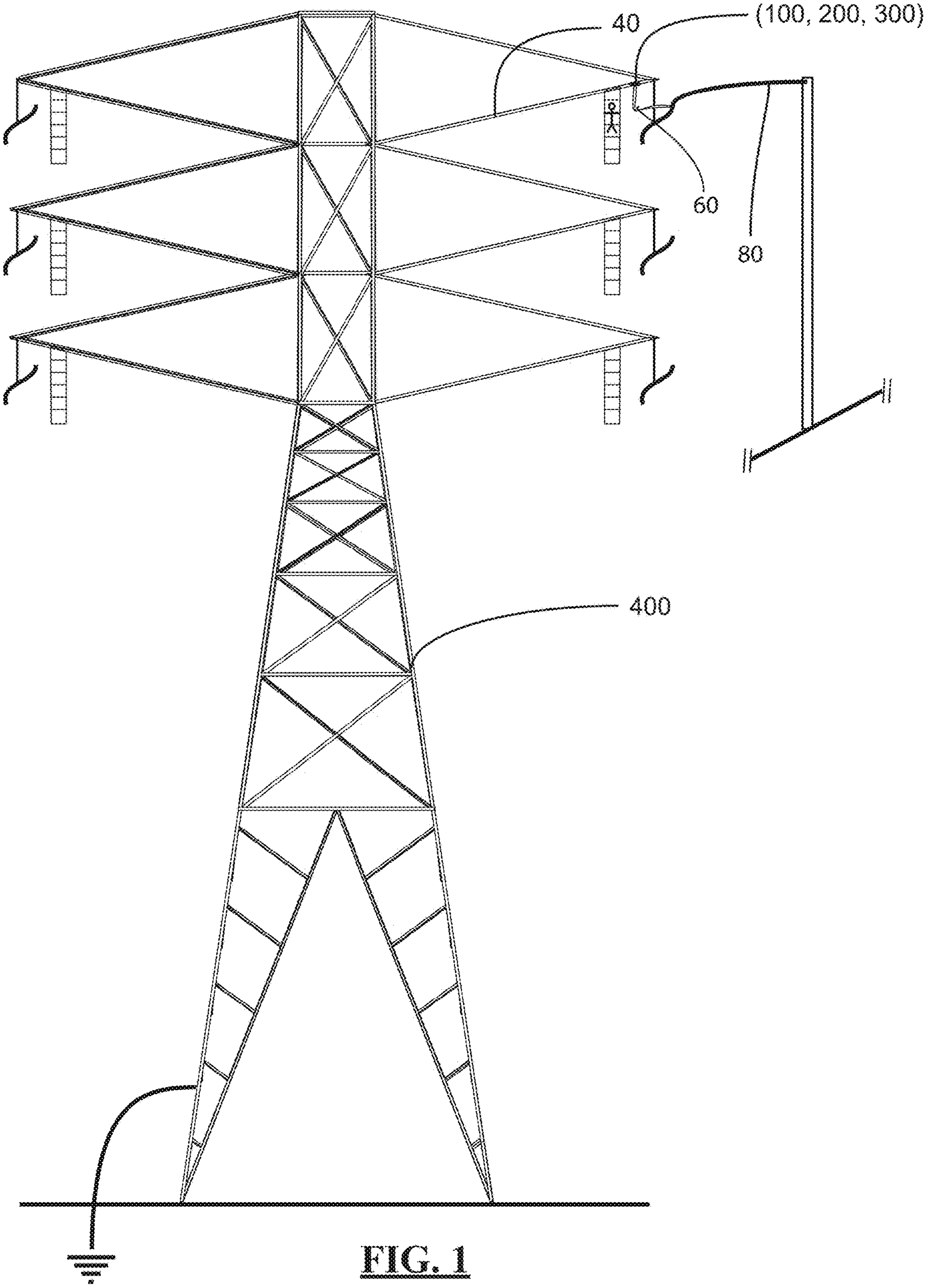
FIG. 1 provides an environmental view of a grounding clamp secured to a high-voltage powerline and ground according to an embodiment of the present invention.
Figure 1A:
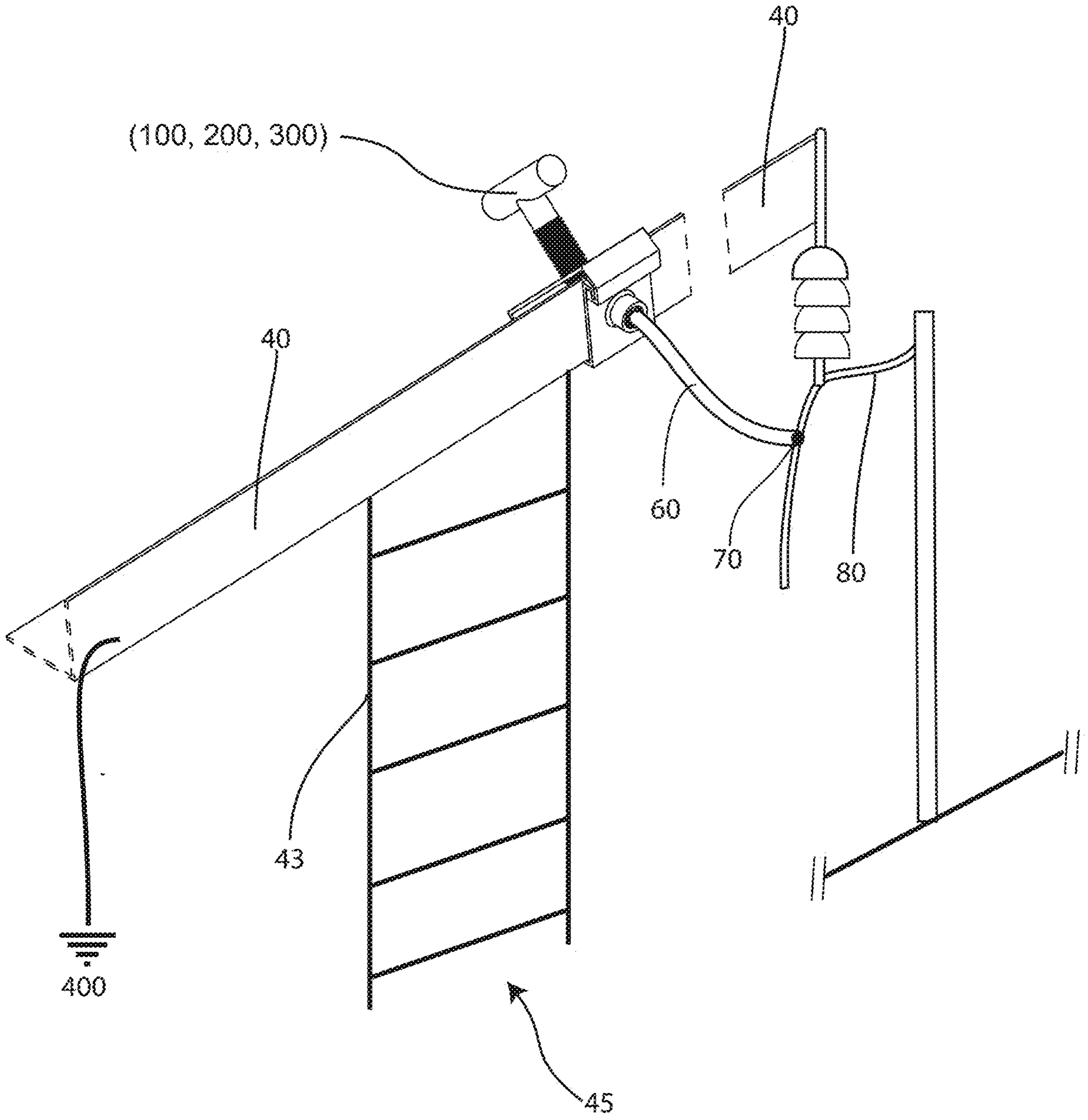
FIG. 1A provides an exemplary environmental view of a grounding clamp secured to an L-beam member of a high-voltage tower and electrically coupled to a de-energizing electrical cable, according to an embodiment of the present invention.
Figure 2:
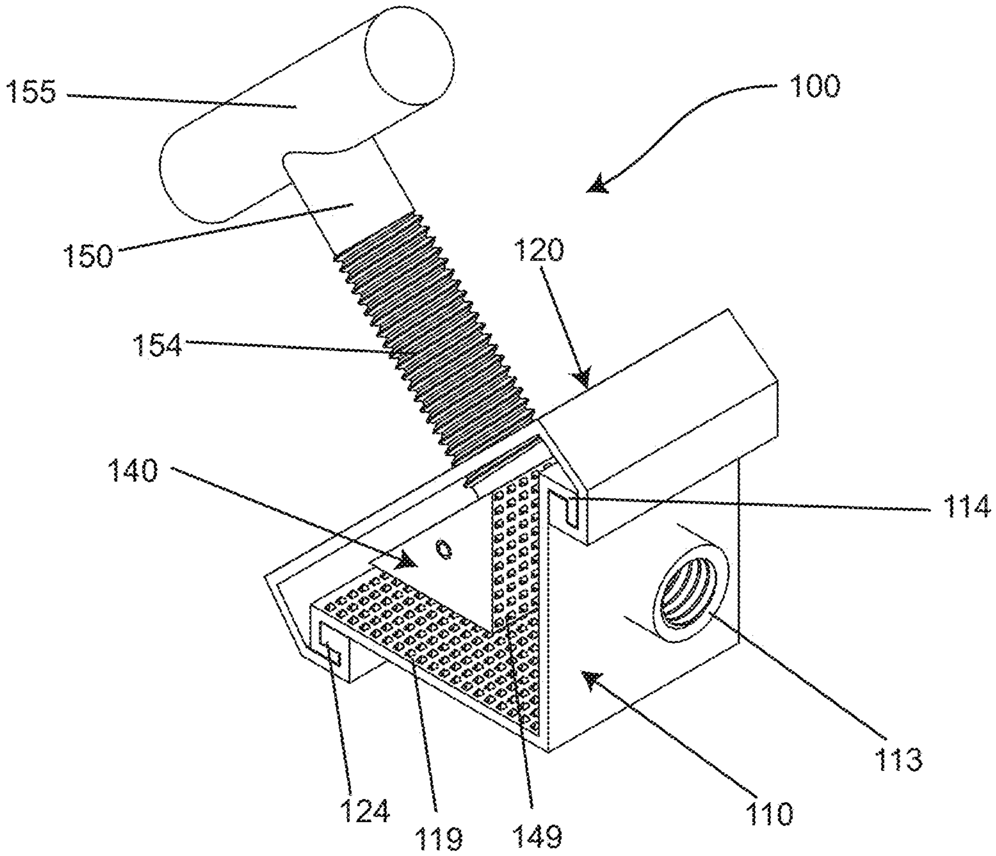
FIG. 2 provides a perspective view of a grounding clamp, according to an embodiment of the present invention.
Figure 3:
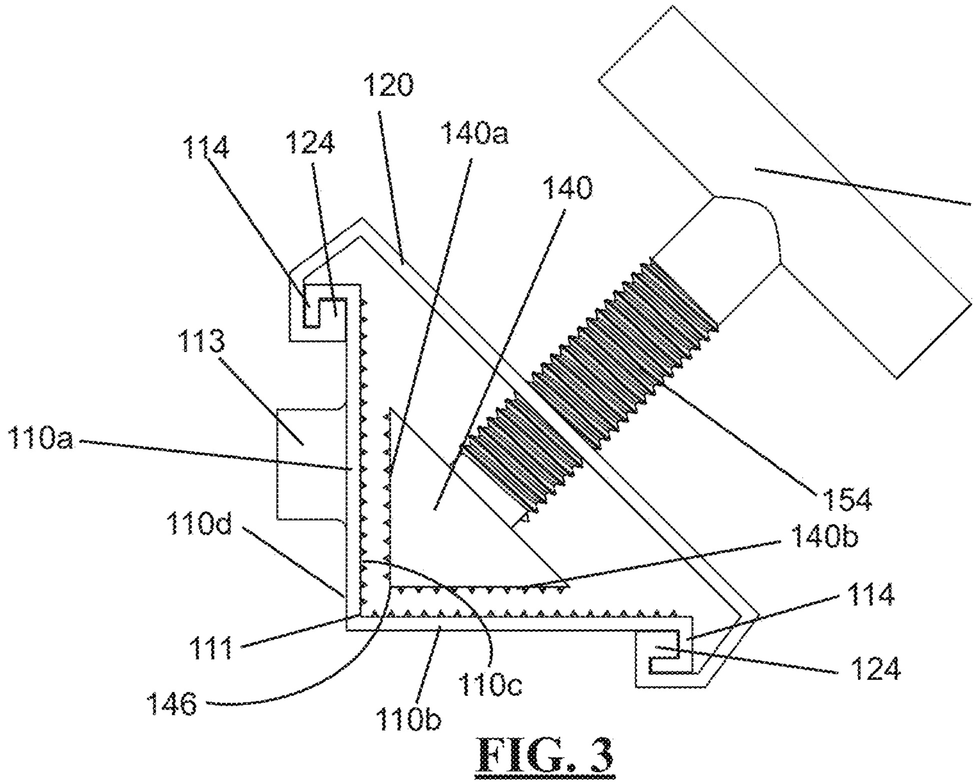
FIG. 3 provides a side view of a grounding clamp, according to an embodiment of the present invention.
Figure 4:
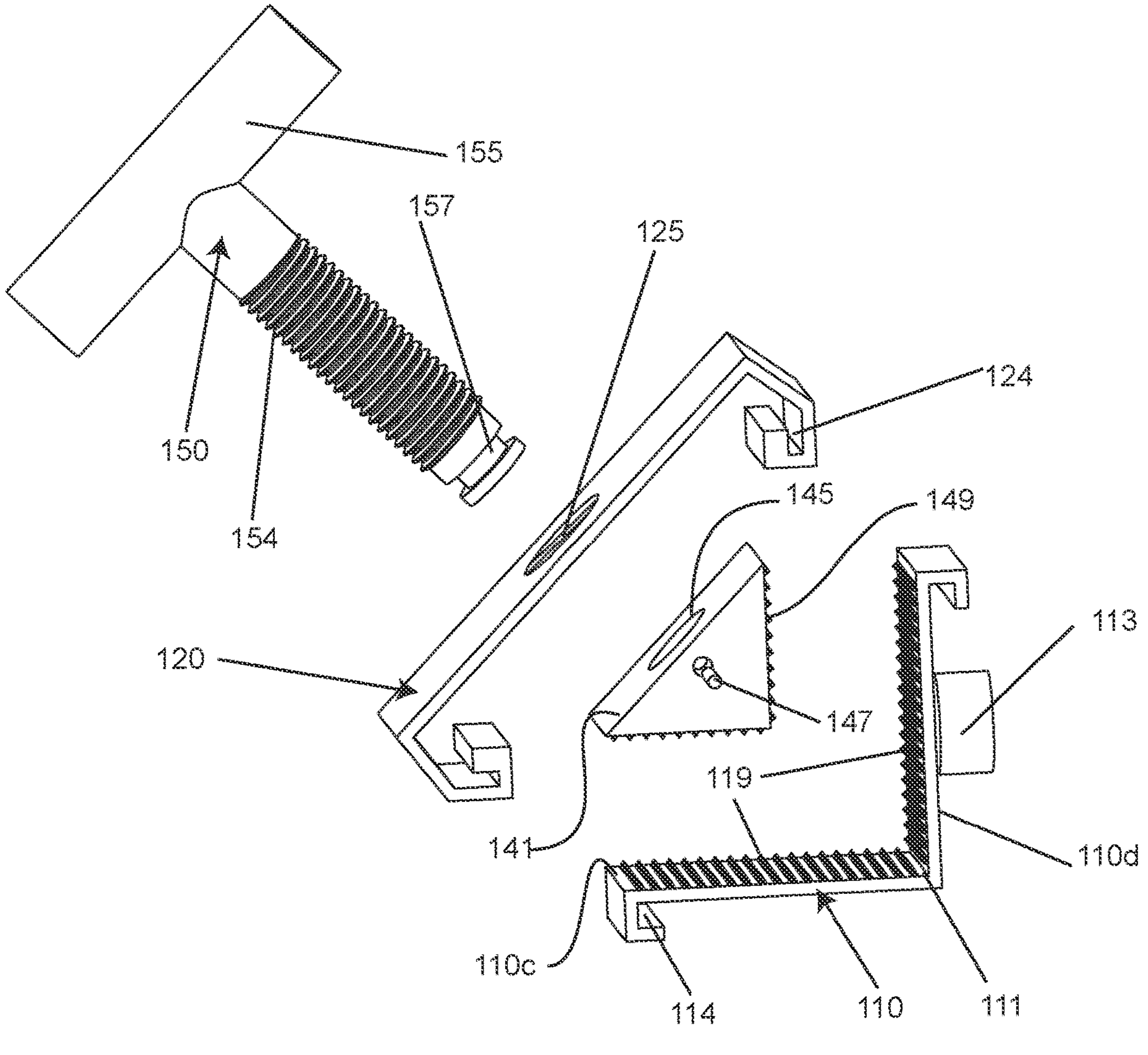
FIG. 4 provides an exploded perspective view of a grounding clamp, according to an embodiment of the present invention.

Referring to the drawings wherein like reference characters designate like or corresponding parts throughout the several views and referring to the environmental views of FIGS. 1 and 1A, it is seen that a high-voltage structure 400 may be electrically grounded to the earth and may be constructed from a plurality of L-shaped beams 40 that are fastened together. In order to repair a de-energized wire 80 on the structure 400, the wire 80 must first be grounded to the structure 400 through an L-beam 40. A lineman may gain access to the wire via access point 45 (which may be a ladder 43 or the like). The lineman may then engage an embodiment of a grounding clamp (100, 200, 300) of the present invention to an L-shaped beam 40 of the high-voltage structure 400. A grounding cable 60 may be connected between the clamp (100, 200, 300) and the de-energized wire 80 at a point 70. In the event that the deenergized wire 80 should somehow become electrically charged at some time during maintenance or repair, because the grounding cable 60 is attached to the clamp (100, 200, 300) any current will be directed through the cable 60 directly to the L-shaped beam 40 and through the structure 400, thereby avoiding and protecting the lineman from electric shock.

Referring to the embodiment 100 illustrated in FIGS. 2-6, it is seen that in this embodiment, a rigid exterior right angle base member 110 is operable to couple to an interior alignment plate 120 that may be used to secure a wedge member 140 against the L-beam 40 using an advancement mechanism 150 comprising a threaded shaft 154 attached to a handle 155. When assembled around the L-beam, the right angle base member 110 and alignment plate 120 are in a fixed orientation and surround the L-beam 40, with the wedge member 140 positioned to compresses against the interior of the L-beam 40. The compression and securement is accomplished by turning the handle 155 of the advancing mechanism 150 which causes a threaded shaft 154 to extend into opening 125 in plate 120 thereby compressing wedge member 140 against L-beam 40. The interlocking edges 124 of plate 120 engage with complementary edges 114 on angle base member 110 such that when the advancing mechanism 150 is fully advanced, the clamp 100 is tightly engaged against the L-beam 40. The clamp 100 may only be disengaged by reversing the advancing mechanism to withdraw wedge member 140 from the interior surface of L-beam 40.

In some embodiments, the rigid right angle base member 110 may include a first plate 110*a* and a second plate 110*b* positioned at an angle of approximately 90 degrees. The first and second plates (110*a*, 110*b*) may have an interior surface face 110*c* and an exterior surface 110*d*. The first and second plates form a corner 111. Each of the plates (110*a*, 110*b*) may include an alignment interface 114 extending along the outer edges of each plate opposite from the corner 111. An alignment plate 120 having a centrally located threaded aperture 125 may be operable to receive an advancement mechanism 150. The alignment plate 120 may include angled flanges 124 at opposite ends thereof which are complementary to and align with angled flanges 114 of the angle base member 110. A ground cable receiver 113 may be positioned on one of the first or second plates (110*a*, 110*b*) on an exterior surface 110*d*. The ground cable receiver 113 may have a threading for receiving a male ground cable connector (not shown) for electrically securement to a ground cable 60. It is to be appreciated that the opposite end of the ground cable 60 is to be connected to a wire or other structure to be grounded to the L-beam 40 tower. The ground cable receiver 113 may be in any suitable form such as a clamp, collar, fastener or other suitable engagement structure.

In the embodiments illustrated in FIGS. 2-6, a wedge member 140 may be rotatably coupled to the advancement mechanism 150. The wedge member 140 may include a base surface 141 with a centrally positioned aperture 145 and a bifurcated planar arrangement extending from the base surface. The bifurcated planar arrangement includes a first planar face 140*a* and a second planar face 140*b* at a perpendicular angle, forming a vertex edge 146.

In some embodiments, the advancement mechanism 150 may include a T-handle 155 positioned on a proximal end and a channel which may be an annular recess 157 positioned on a distal end with threading 154 therebetween for engaging with the threaded aperture 125 of the alignment plate 120. In these embodiments, the channel 157 may be inserted into the wedge member aperture, and once inserted, a pin 147 may be inserted through a pinhole in wedge member 140 and into channel 157 to prevent separation.

In some embodiments, the interior surface 110*c* of the right angle member 110 may be smooth, or it may have a rough surface, an indented pattern, a crosshatch pattern, serrated edges, ridges and grooves, a knurled surface or other grip-enhancing structures 119 that is distributed along the interior surface of the first plate 110*a* and the second plate 110*b*. The exterior planar faces 140*a*, 140*b* of the wedge member 140 may include a rough surface, an indented pattern, a crosshatch pattern, serrated edges, ridges and grooves, a knurled surface or other grip-enhancing structures 149.

Figure 5A:
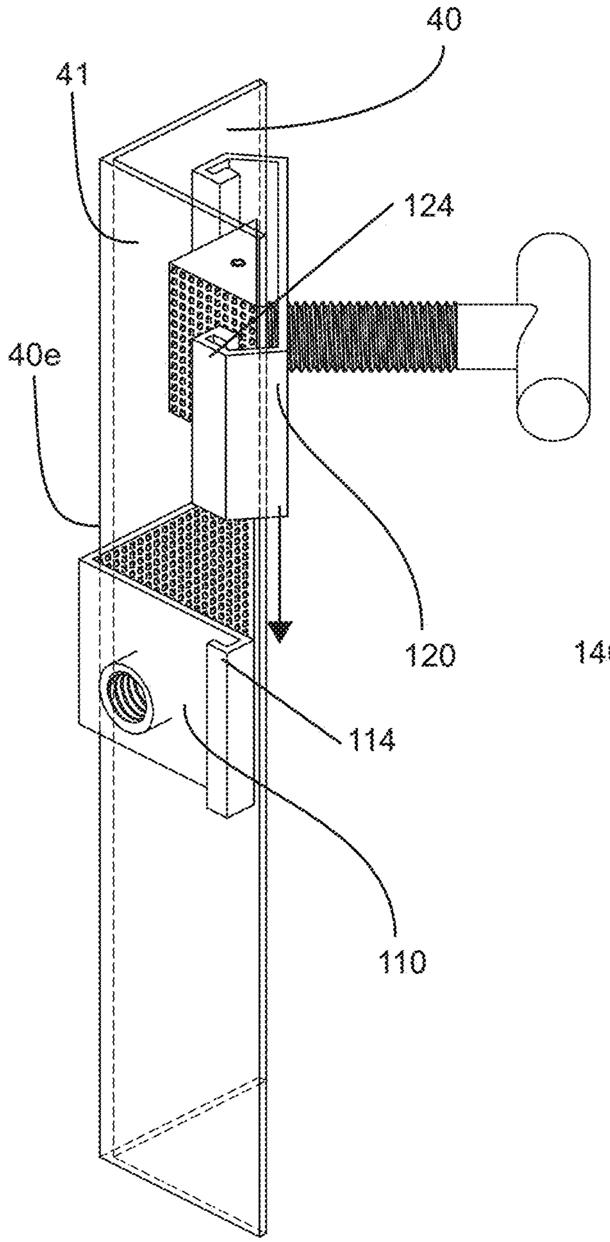
FIG. 5A provides a perspective view of a grounding clamp installation step, according to an embodiment of the present invention.
Figure 5B:
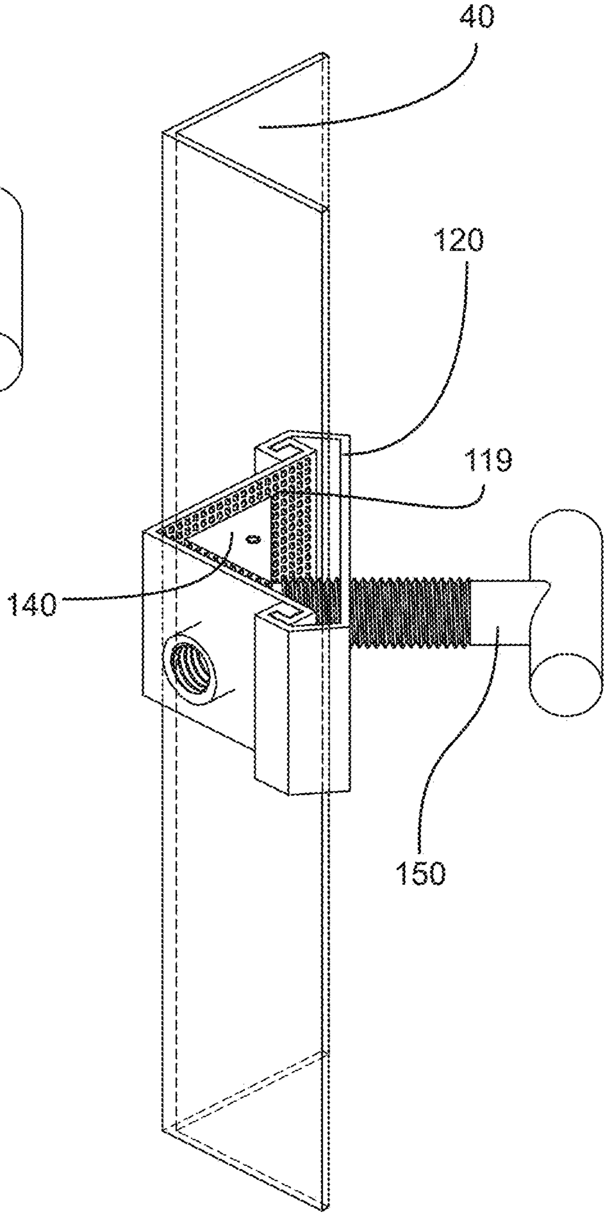
FIG. 5B provides a perspective view of a grounding clamp installation step, according to an embodiment of the present invention.
Figure 6:
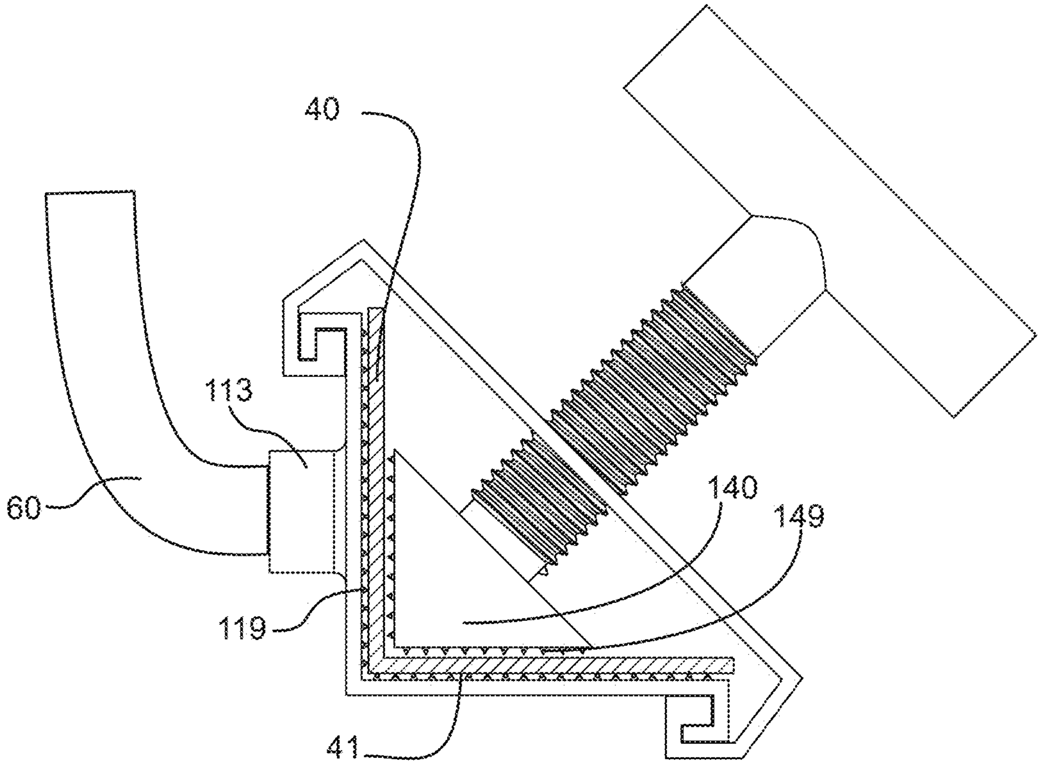
FIG. 6 provides a top view of a grounding clamp secured to an L-beam member of a high-voltage tower, according to an embodiment of the present invention.
Figure 7:
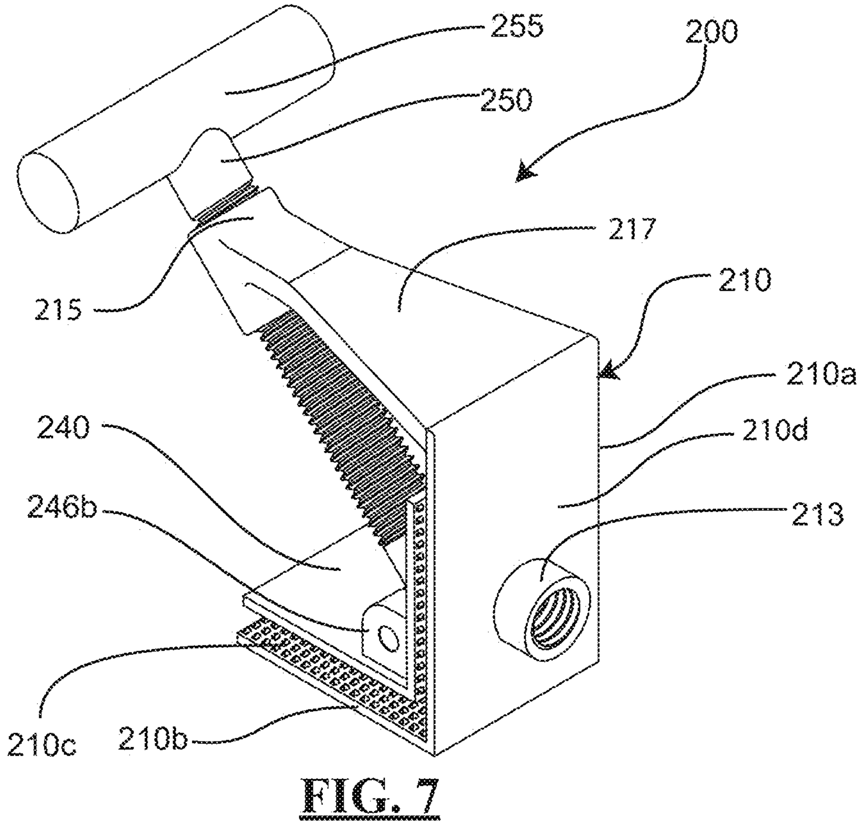
FIG. 7 provides a perspective view of a grounding clamp, according to an embodiment of the present invention.
Figure 8:
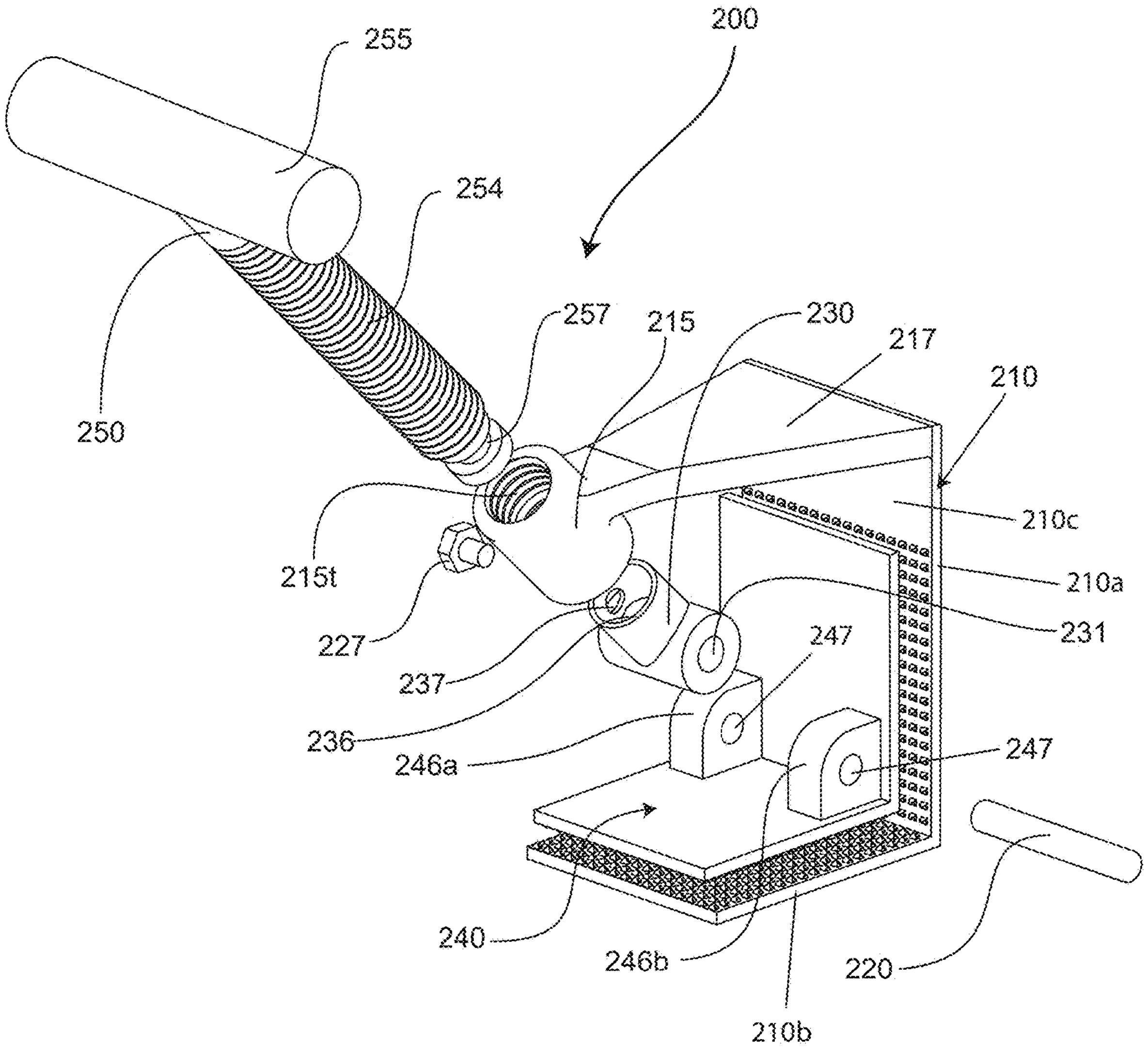
FIG. 8 provides an isometric perspective view of a grounding clamp in an exploded configuration, according to an embodiment of the present invention.

In operation, as illustrated in FIGS. 5A, 5B and 6, the exemplary ground clamp 100 may be assembled around an L-beam 40 of a high voltage tower 400, it is to be appreciated that the L-beam is a rigid metallic beam that is part of a high voltage tower 400, but that the L-beam is illustrated with transparency in these figures to provide a clear illustration of the installation and operation of the clamp 100. The right angle base member 110 may be positioned around the outer surface 41 of the L-beam 40. The corner 111 of the right angle member may be positioned along the outer vertex edge 40*e* of the L-beam 40. The alignment plate 120 may be partially assembled with the advancement mechanism 150 and wedge member 140. The alignment plate 120 may then be positioned above or below the right angle base member 110, as illustrated in FIG. 5A. The peripheral alignment structure 124 of the alignment plate 120 may be slid into the alignment interface 114 of the right angle base member 110 as illustrated in FIG. 5B. The advancement mechanism 150 may then be fully engaged, thereby translating the wedge member 140 into the interior corner edge of the L-beam 40 and clamping around the L-beam 40. As best illustrated in FIG. 6, when the grounding clamp 100 is secured, the right angle base member 110 and the wedge member 140 firmly compress against the L-beam 40. One end of a ground cable 60 may then be secured to the ground cable receiver 113, and the other end of ground cable 60 may be attached to the wire to be grounded. If provided, the grip-enhancing structures (119, 149) may provide increased frictional resistance to prevent slip of the clamp.

In other embodiments, such as those shown in the illustrations of FIGS. 7-9B, the embodiment of the grounding clamp 200 may have a main body securing an advancement mechanism coupled to a wedge member with no alignment plate. Instead, one end of an extension 217 is attached to one of plates 210*a* or 210*b*, and the opposite end 215 of extension 217 supports an advancing mechanism 250. It is seen in the exemplary embodiment of FIGS. 7-8, that the grounding clamp 200 includes a rigid right angle main body 210 and a wedge member 240 that is advanced to compress an L-beam. It is to be appreciated that in other embodiments, a wedge 140 similar to that shown in FIGS. 2-6 may be used. The main body 210 may include a rigid right angle member having a first plate 210*a* and a second plate 210*b* positioned at an angle of approximately 90 degrees. The first and second plates (210*a*, 210*b*) have an interior surface face 210*c* and an exterior surface 210*d*. The main body 210 may have an extending member 217 projecting from a top peripheral edge of the first plate 210 to secure a conduit 215 such that the central axis of the conduit 215 is aligned with the vertex edge 211 of the first and second plates (210*a*, 210*b*).

In the embodiments of FIGS. 7-9B, the illustrated wedge member 240 having first and second plates (240*a*, 240*b*) may be coupled to an advancement mechanism 250 with a U-joint 230. As noted above, in alternative embodiments such as those shown in FIGS. 2-6, a wedge member 140 and advancement mechanism 150 may be used. The interior surface of the wedge member 240 may include a pair of flanges (246*a*, 246*b*) that are operable to position a U-joint 230 therebetween. The pair of flanges (246*a*, 246*b*) may each have a through hole 247 operable of aligning with and receiving a shaft 220. When the shaft is inserted through the U-joint through hole 231, the U-joint 230 is rotatably coupled to the wedge member 240. The U-joint 230 may have an aperture 236 and a fastening hole 237 orthogonally aligned with the central axis of the aperture. The advancement mechanism 250 may include a T-handle 255 secured to a proximal end of a shaft and a channel which may be an annular recess 257 on a distal end having threading 254 therebetween for engaging with the main body conduit threading 215*t*. The advancement mechanism 250 may be inserted into the U-joint aperture 236 and the channel 257 may be aligned with the fastening hole 237 and linearly secured with post 227. The U-joint 230 is operable to allow for rotation of the advancement mechanism 250 along the central axis of the aperture 236 when the wedge is advanced and swiveling of the wedge member 240 around the shaft 220. Similar to other embodiments, the interior surfaces of the main body 210 and the exterior surfaces of the wedge member 240 may have a grip-enhancing structure (219, 249) that is operable to provide additional friction and bit on the L-beam 40 when in the clamped position.

Figure 9A:
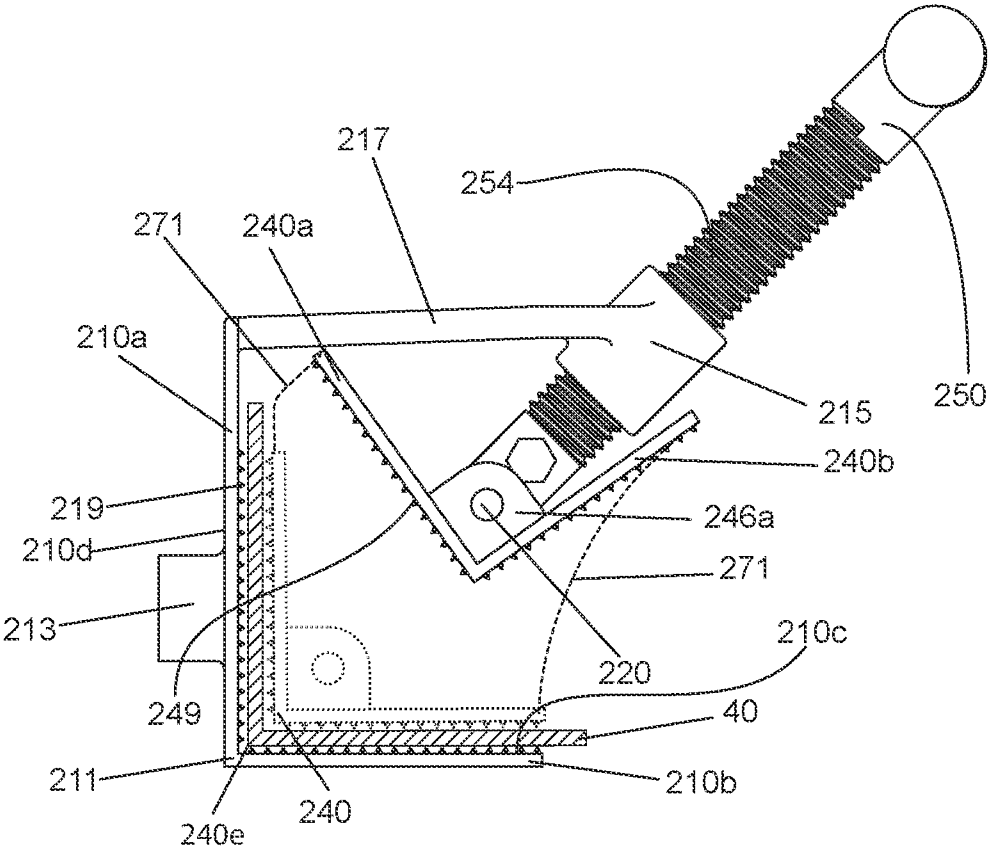
FIG. 9A provides an exemplary side view of a grounding clamp installation step, according to an embodiment of the present invention.
Figure 9B:
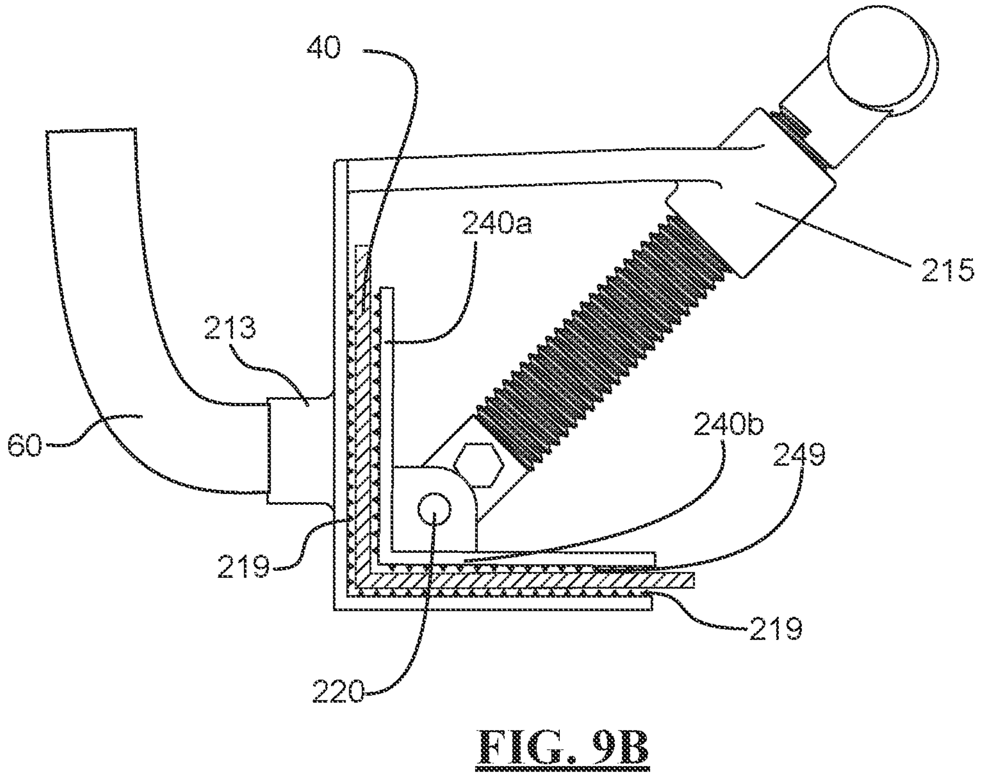
FIG. 9B provides an exemplary side view of a grounding clamp secured to an L-beam member of a high-voltage tower, according to an embodiment of the present invention.
Figure 10:
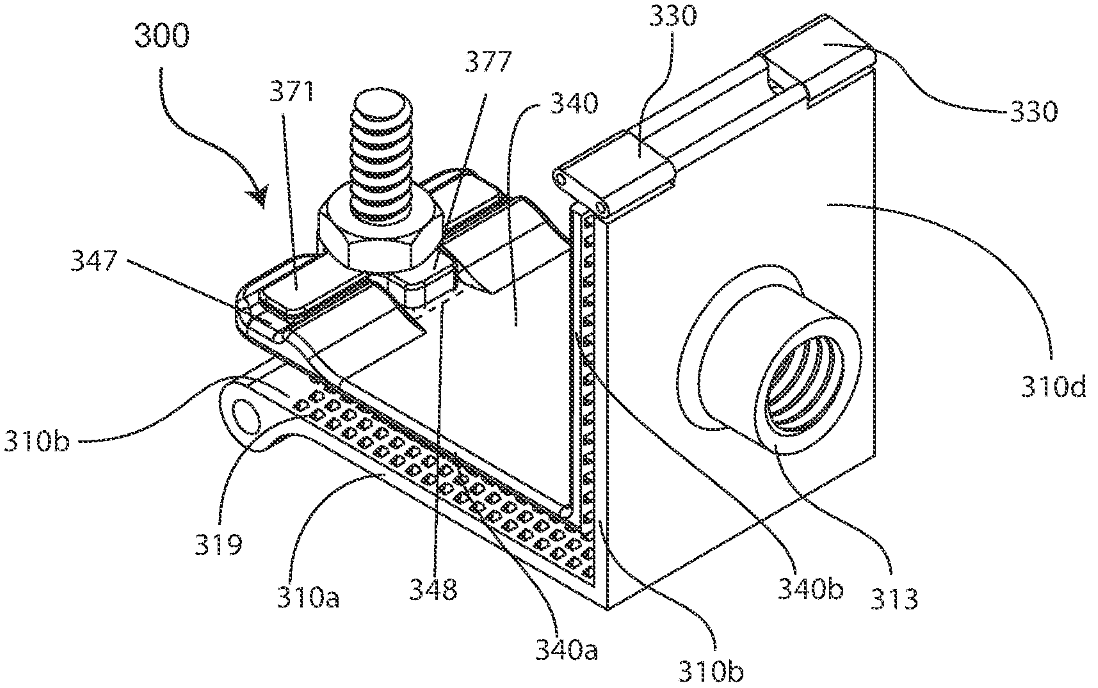
FIG. 10 provides an exemplary perspective view of a ground clamp in a closed position, according to an embodiment of the present invention.

In such embodiments, as illustrated in FIGS. 9A and 9B, the grounding clamp 200 may be secured to an L-beam 40. The interior surface 210*c* of the main body 210 may be positioned against the outer surface of the L-beam 40 and the vertex 211 of the main body 210 may be aligned with the L-beam vertex edge 240*e*. The advancement mechanism 250 may be engaged by turning the T-handle 255 and the wedge 240 may swivel around the shaft 220, the wedge ends may travel along the exemplary path 271 to the final position illustrated in FIG. 9B. The wedge 240 may advance along the conduit axis and align with the corner interior edge of the L-beam 40. The advancement mechanism threading 254 follows the conduit threading 215*t* and may lock the wedge 240 against the L-beam 40, thereby creating a solid electrical connection. The grounding clamp 200 may have a ground cable receiver 213 that is operable to connect and receive a male ground cable 60 electrically.

Figure 11:
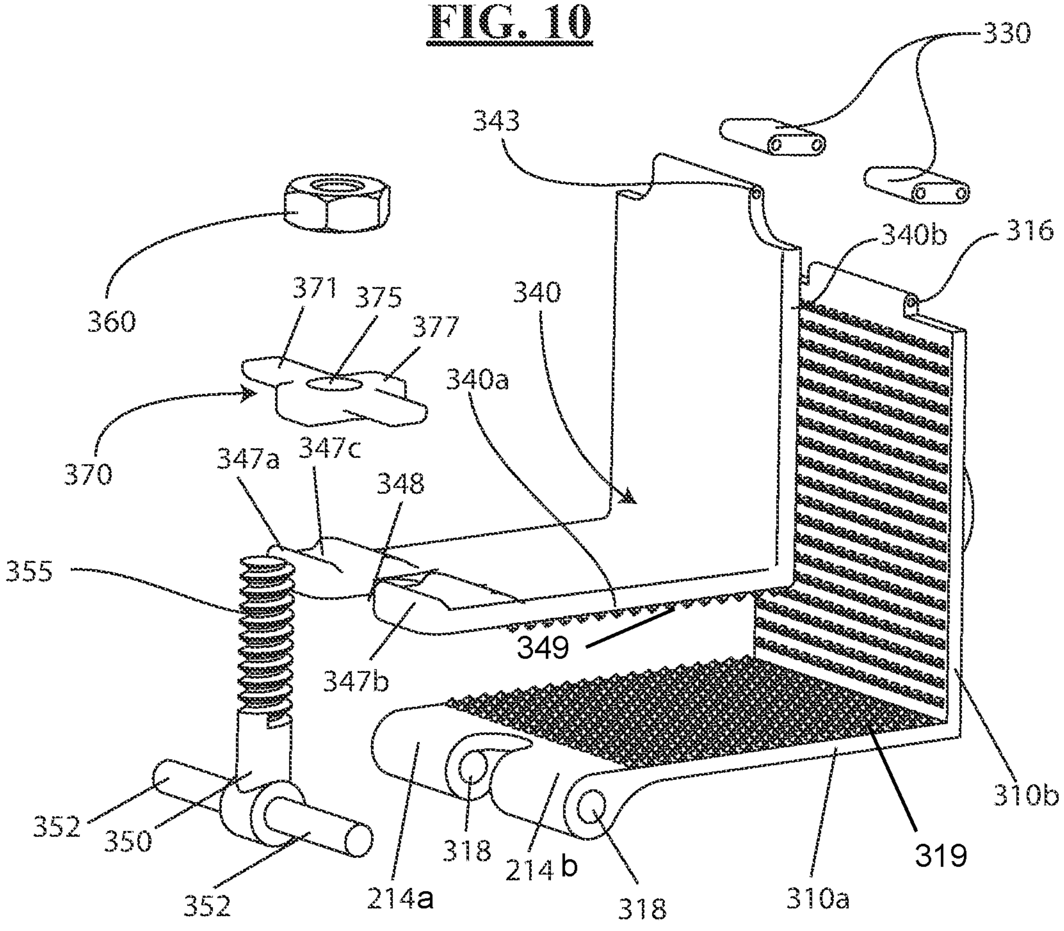
FIG. 11 provides an exemplary exploded perspective view of a grounding, according to an embodiment of the present invention.
Figure 12:
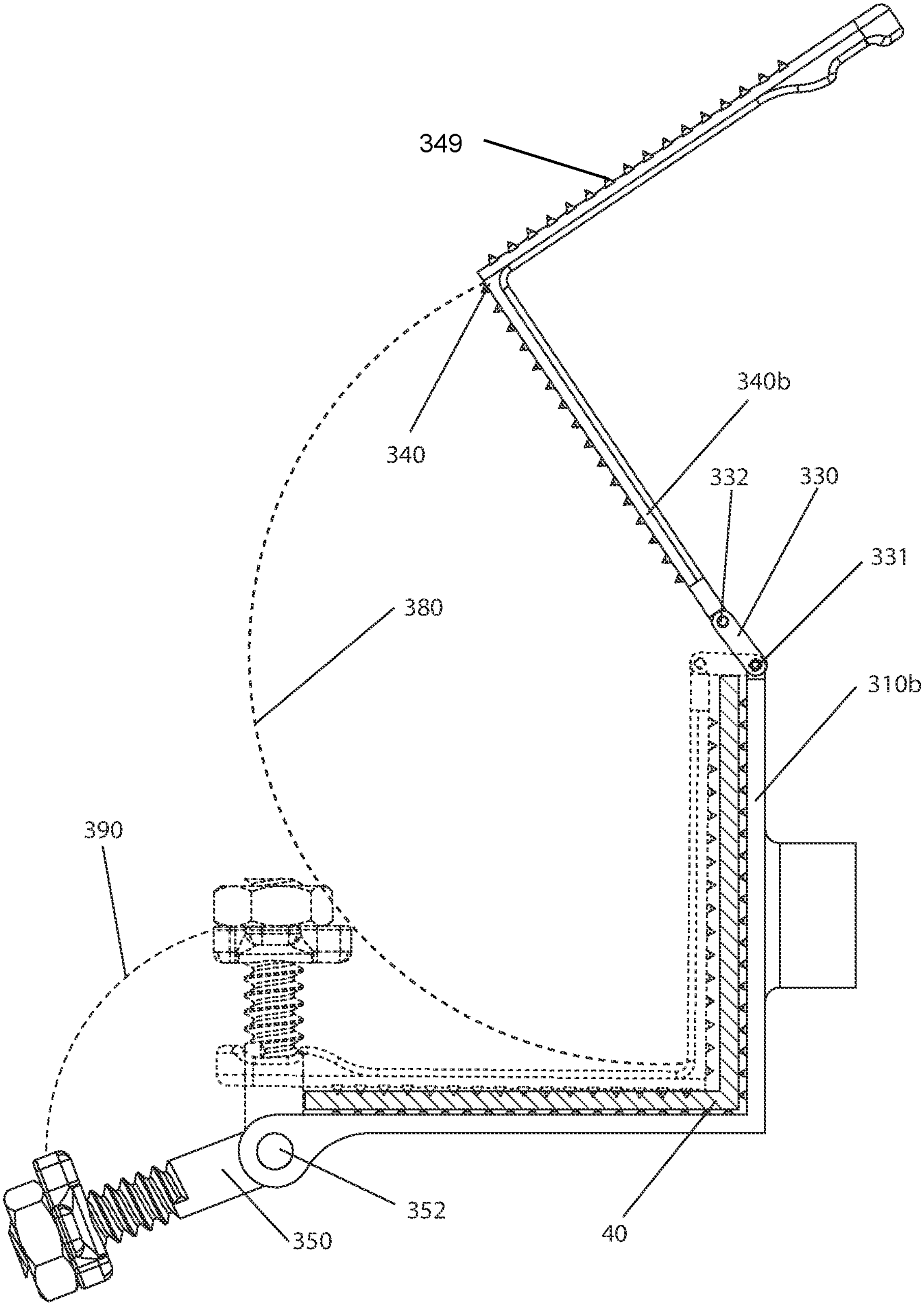
FIG. 12 provides an exemplary side view of a grounding clamp being configured from an open position to a closed position, according to an embodiment of the present invention.
Figure 13:
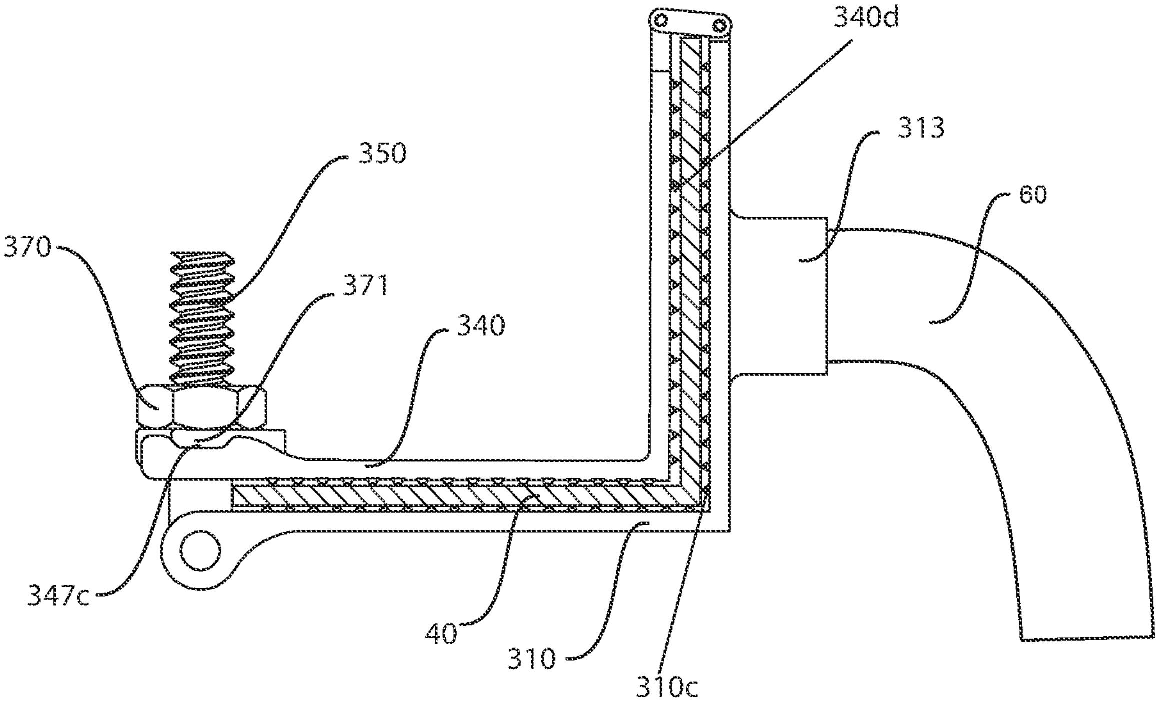
FIG. 13 provides an exemplary side view of a grounding clamp in a closed position and secured to an L-beam member of a high-voltage tower, according to an embodiment of the present invention.
Figure 14:
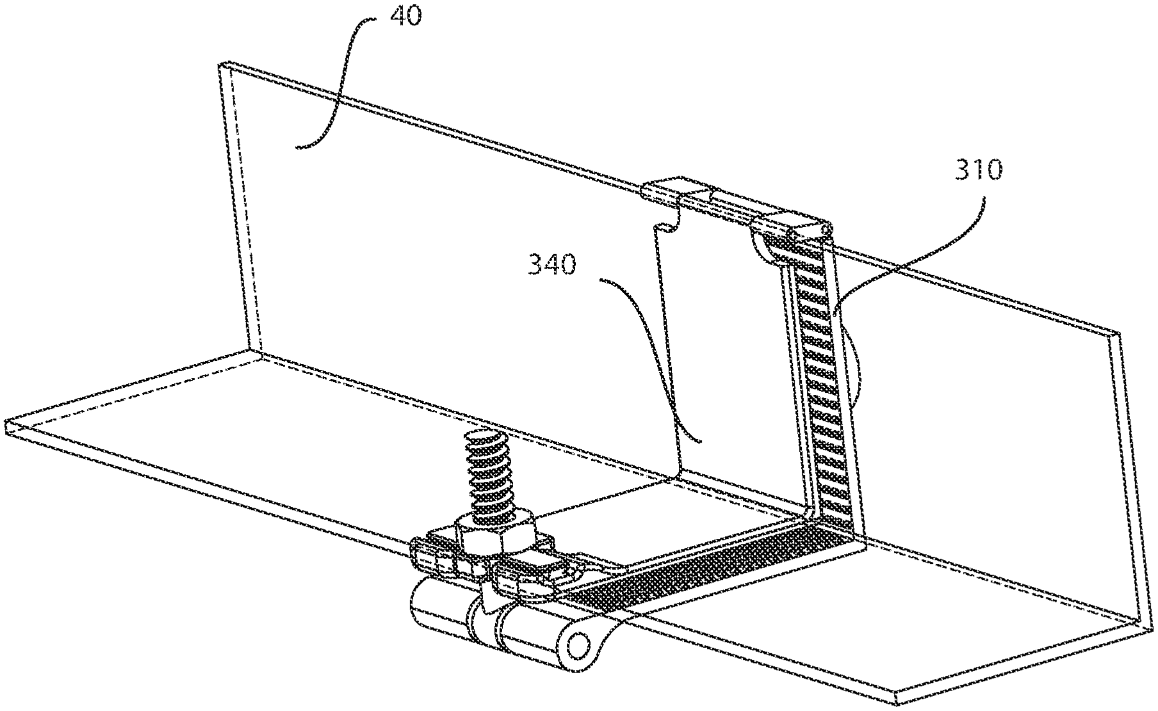
FIG. 14 provides an exemplary perspective view of a grounding clamp in a closed position and secured to an L-beam member of a high-voltage tower, according to an embodiment of the present invention.

In other embodiments, as illustrated in FIGS. 10-14, it is seen that the grounding clamp 300 may include a first L-shaped member 310 and a second L-shaped member 340. As shown in FIG. 13, the interior surface 310*c* of the first L-shaped member 310 is operable to interface with the exterior surface of a L-beam 40, and the exterior surface 340*d* of the second L-shaped member 340 is operable to interface with the interior surface of the L-beam 40, when in the clamped position. In such embodiments, the vertical plates (310*b*, 340*b*) may be coupled using a hinge or linkage 330 that is operable to allow the second L-shaped member 340 to swivel along a path 380 from an open position to a closed position, as shown in FIG. 12.

Referring to FIG. 11, it is seen that the top edge of the vertical plate 310*b* may have a through hole 316 for rotatably coupling to the through hole 331 of the linkage 330, and the top edge of the vertical plate 340*b* may have a through hole 343 for coupling to the through holes (332) of the linkage 330, it is to be appreciated that although large linkages 330 are illustrated in the drawings, in other embodiments larger or smaller hinges may be used, according to the size of the metallic frame to which the grounding clamp 300 is intended to be attached to. Similar to other embodiments, the interior surface 310*c* of the first member 310 and the exterior surface 340*d* of the second member 340 may have a grip-enhancing structure (319, 349) that is operable to provide additional friction and bit on the L-beam 40 when in the clamped position.

In embodiments such as those illustrated in FIGS. 10-14, the horizontal plate 340*a* of the second L-shaped member 340 may have a pair of tabs (347*a*, 347*b*) extending from a peripheral edge of the plate 340*a* and a slot 348 positioned in the space between the tabs (347*a*, 347*b*) that is operable to receive a fastener shaft or rod 355. The pair of tabs (347*a*, 347*b*) may each have a channel 347*c* that is operable to position a protrusion 371 of a fastener plate 370 when clamping the second member 340 to the first member 310. Similarly, the horizontal plate 310*a* of the first L-shaped member 310 may have a pair of tabs (214*a*, 214*b*) that extend from a peripheral edge of the plate 310*a* and below the exterior surface 310*d*, the tabs (214*a*, 214*b*) may each include a through hole 318 that is operable to receive a shaft 352 of a clamp or fastening mechanism 350. The fastener shaft 355 may be positioned between the tabs (214*a*, 214*b*) and may rotate around the through hole 318 along the path 390 to the clamping position as shown in FIG. 12. The fastener plate 370 may include a conduit 375 that is operable to be positioned around the fastener shaft 355 and may include a pair of protrusions 371 and an alignment tab 377 that is positioned between the gap provided by the slot 348 of the second L-shaped member. A nut 360 may engage with the threading of the fastener shaft 355 and may be advanced to secure the fastener plate 370 to the pair of tabs (347*a*, 347*b*) when configuring the clamp 300 in the closed position. It is to be appreciated that although a bolt and nut fastener is illustrated in the drawings, in other embodiments, a vise grip mechanism, a spring-loaded cam lock, spline connection, magnetic clasp, hydraulic cylinder, spring-loaded ball detents, or other clamps or linear fastening mechanisms may be used to, according to the regulations for grounding clamps set by NESC.

During the installation of a grounding clamp 300 shown in FIGS. 10-14, a lineman may position the interior surface 310*c* of the first L-shaped member 310 against the exterior surface of the L-beam 40. The second L-shaped member 340 may be rotated around the L-beam 40 about the hinge 330 and may position the exterior surface 340*d* against the interior surface of the L-beam 40, and the fastening mechanism 350 may be rotated around the shaft 352 to position the shaft 355 between the pair of tabs (347*a*, 347*b*) and the protrusions 371, and alignment tab 377 of the fastener plate 370 may align with the tab channel 347 and slot 348 and the L-beam 40 may be compressed on the interior and exterior surface by tightening of the nut 360. A ground cable 60 may then be attached to the cable receiver 313 to ground the L-beam 40 electrically, thereby grounding an electrical cable to the high-voltage structure 400.

It is to be understood that variations, modifications, and permutations of embodiments of the present invention, and uses thereof, may be made without departing from the scope of the invention. It is also to be understood that the present invention is not limited by the specific embodiments, descriptions, or illustrations or combinations of either components or steps disclosed herein. The embodiments were chosen and described in order to best explain the principles of the invention and its practical application, to thereby enable others skilled in the art to best utilize the invention and various embodiments with various modifications as are suited to the particular use contemplated. Although reference has been made to the accompanying figures, it is to be appreciated that these figures are exemplary and are not meant to limit the scope of the invention. It is intended that the scope of the invention be defined by the claims appended hereto and their equivalents.

No Warranties

The preceding detailed description has been prepared to solely comply with the provisions of 35 U.S.C. § 112, and does not constitute a commercial warranty, (either expressed or implied), as to the effectiveness of the apparatus and methods disclosed herein, nor does this disclosure constitute any type of certification or guarantee of any particular outcomes. Therefore, this disclosure may not be relied upon to support any future legal claims including, but not limited to, breach of warranty of merchantability, or fitness for any particular purpose which is directed, in whole, or in part, to the present apparatus or methods.

What is claimed is:

1. A grounding clamp for use with an L-shaped beam comprising:

a. a rigid metallic base member comprising a first plate and a second plate wherein an edge of said first plate is attached to an edge of said second plate at a right angle defining an interior surface and an exterior surface, wherein a first angled flange is provided at an opposite edge of said first plate and a second angled flange is provided at an opposite edge of said second plate;

b. a rigid metallic alignment member having a threaded aperture therein, a third angled flange at one edge of said alignment member, and a fourth angled flange at an opposite edge thereof, wherein said first and third flanges are complementary to and capable of interlocking with each other, and said second and fourth flanges are complementary to and capable of interlocking with each other, for coupling said base member and said alignment member around said L-shaped beam;

c. a threaded shaft for engagement with said threaded aperture, said shaft having a handle at a proximal end thereof; and d. a wedge member having a triangular cross section rotatably coupled to a distal end of said shaft.

2. The grounding clamp of claim 1, wherein rotation of said shaft moves said wedge member toward said interior surface of said base member.

3. The grounding clamp of claim 1, wherein said triangular wedge member includes first and second surfaces having interior edges attached to each other at a right angle, and a third surface attached between opposite edges of said first and second surfaces, wherein said third surface has a recess therein for engagement with a distal end of said shaft, and an exterior of said first and second surfaces is complementary to the interior surface of said base member.

4. The grounding clamp of claim 1, further comprising a receiver attached to said exterior surface of said base that is operable to receive a grounding cable.

5. The grounding clamp of claim 3, wherein a grip-enhancing structure is provided on one of: the interior surface of said base member, the outer surface of said wedge member, or both the interior surface of said base member and the outer surface of said wedge member.

6. The grounding clamp of claim 5, wherein said grip-enhancing structure is selected from the group of a rough surface, an indented pattern, a crosshatch pattern, serrated edges, ridges and grooves, a knurled surface, and combinations thereof.

7. The grounding clamp of claim 1, further comprising a channel near a distal end of said shaft, a pinhole in said wedge member, and a pin operable to engage with said channel through said pinhole.

8. The grounding clamp of claim 1, wherein said rigid base member has a generally L-shaped cross-section that is complementary to the geometry of said L-angle beam.

9. A grounding clamp for use with an L-shaped beam comprising:

a. a rigid metallic base member comprising a first plate and a second plate wherein an edge of said first plate is attached to an edge of said second plate at a right angle defining an interior base surface and an exterior base surface, said base member further comprising a support member attached at an opposite edge of one of said first plate and said second plate, said support member having a threaded opening therein;

b. a threaded shaft for engagement with said threaded opening, said shaft having a handle at a proximal end thereof;

c. a wedge member comprising a first wedge plate and a second wedge plate wherein an edge of said first wedge plate is attached to an edge of said second wedge plate at a right angle defining an interior wedge surface and an exterior wedge surface, wherein said exterior wedge surface is complementary to said interior base surface; and d. a receptacle pivotally attached to said interior wedge surface for receiving a distal end of said shaft.

10. The grounding clamp of claim 9 wherein said receptacle comprises a U-joint having an opening therein for receiving the distal end of said shaft.

11. The grounding clamp of claim 10 wherein a pair of flanges having openings therein are provided on said interior wedge surface, and said U-joint is pivotally attached to said wedge surface using an alignment pin extending through said flange openings and a through hole in said U-joint.

12. The grounding clamp of claim 9, wherein rotation of said shaft moves said wedge member toward said interior surface of said base member.

13. The grounding clamp of claim 9, further comprising a channel near a distal end of said shaft, a fastening hole in said receptacle, and post operable to engage with said channel through fastening hole.

14. The grounding clamp of claim 9, wherein a grip-enhancing structure is provided on one of: the interior surface of said base member, the exterior surface of said wedge member, or both the interior surface of said base member and the exterior surface of said wedge member.

15. The grounding clamp of claim 14, wherein said grip-enhancing structure is selected from the group of a rough surface, an indented pattern, a crosshatch pattern, serrated edges, ridges and grooves, a knurled surface, and combinations thereof.

16. The grounding clamp of claim 9, further comprising a receiver attached to said exterior surface of said base that is operable to receive a grounding cable.

17. A grounding clamp for use with an L-shaped beam comprising:

a. a rigid metallic base member comprising a first plate and a second plate wherein an edge of said first plate is attached to an edge of said second plate at a right angle defining an interior base surface and an exterior base surface, said base member further comprising a hinge located at an opposite edge of said first base plate;

b. a wedge member comprising a first wedge plate and a second wedge plate wherein an edge of said first wedge plate is attached to an edge of said second wedge plate at a right angle defining an interior wedge surface and an exterior wedge surface, wherein an opposite edge of said first wedge plate is movably engaged with said hinge; and c. a clamp provided at an opposite edge of said second base plate for engagement with an opposite edge of said second wedge plate.

18. The grounding clamp of claim 17 further comprising a receiver attached to said exterior surface of said base that is operable to receive a grounding cable.

19. A method for electrically grounding an L-shaped beam comprising the steps of:

a. positioning a first rigid metallic L-shaped member having an interior surface and exterior surface against an outer surface of said L-shaped beam;

b. positioning a second rigid metallic member having an L-shaped exterior surface against an interior surface of said L-shaped beam;

c. securely clamping said first and second rigid metallic members together around said L-shaped beam; and d. connecting an electrical cable to a cable receiver on said exterior surface of said first rigid member.

20. The method of claim 19, wherein a support member having a threaded opening therein is provided adjacent to said second rigid metallic member, and a threaded shaft is provided for insertion into said opening, the method comprising the additional step of rotating said shaft to tighten said second rigid metallic member against said L-shaped beam.

* * * * *